(12) United States Patent
Sixt

(10) Patent No.: US 9,181,433 B2
(45) Date of Patent: Nov. 10, 2015

(54) ORGANOSILOXANE COMPOSITIONS CROSS-LINKING AT ROOM TEMPERATURE

(71) Applicant: Wacker Chemie AG, Munich (DE)

(72) Inventor: Torsten Sixt, Mehring (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/418,587

(22) PCT Filed: Jul. 30, 2013

(86) PCT No.: PCT/EP2013/066037
§ 371 (c)(1),
(2) Date: Jan. 30, 2015

(87) PCT Pub. No.: WO2014/026849
PCT Pub. Date: Feb. 20, 2014

(65) Prior Publication Data
US 2015/0152263 A1    Jun. 4, 2015

(30) Foreign Application Priority Data

Aug. 17, 2012   (DE) .................. 10 2012 214 695

(51) Int. Cl.
| | | |
|---|---|---|
| *C08L 83/04* | (2006.01) | |
| *C08G 77/08* | (2006.01) | |
| *C08K 3/34* | (2006.01) | |
| *C09J 183/04* | (2006.01) | |
| *C09K 3/10* | (2006.01) | |
| *C08K 3/22* | (2006.01) | |

(52) U.S. Cl.
CPC .............. *C08L 83/04* (2013.01); *C08G 77/08* (2013.01); *C08K 3/34* (2013.01); *C09J 183/04* (2013.01); *C09K 3/1018* (2013.01); *C08K 2003/2227* (2013.01); *C08L 2312/00* (2013.01); *C08L 2312/08* (2013.01)

(58) Field of Classification Search
None
See application file for complete search history.

(56) References Cited

U.S. PATENT DOCUMENTS

| 2,843,555 | A | 7/1958 | Berridge |
| 3,305,502 | A | 2/1967 | Lampe |
| 4,499,230 | A | 2/1985 | Lockhart |
| 6,506,279 | B1 * | 1/2003 | Luft et al. .................... 156/329 |
| 6,753,400 | B2 | 6/2004 | Inoue et al. |
| 2007/0237912 | A1 | 10/2007 | Correia |
| 2012/0004376 | A1 | 1/2012 | Sixt |

FOREIGN PATENT DOCUMENTS

| DE | 1254352 B | 11/1967 |
| DE | 1494065 A1 | 2/1969 |
| DE | 2640328 A1 | 3/1977 |
| EP | 2402398 A1 | 1/2012 |
| JP | 4-88059 | * 3/1992 |
| WO | WO 2013/100175 | * 7/2013 |

* cited by examiner

*Primary Examiner* — Marc Zimmer
(74) *Attorney, Agent, or Firm* — Brooks Kushman P.C.

(57) ABSTRACT

Thorough in-depth cure of RTV-2 silicone compositions is accomplished by including moisture-saturated molecular sieves into at least one of the two RTV-2 components.

3 Claims, No Drawings

ORGANOSILOXANE COMPOSITIONS CROSS-LINKING AT ROOM TEMPERATURE

CROSS REFERENCE TO RELATED APPLICATIONS

This application is the U.S. National Phase of PCT Appln. No. PCT/EP2013/066037 filed 30 Jul., 2013, which claims priority to German Application No. 10 2012 214 695.4 filed Aug. 17, 2012, the disclosures of which are incorporated in their entirety by reference herein.

BACKGROUND OF THE INVENTION

1. Field of the Invention

The invention pertains to RTV-2 silicone compositions.

2. Description of the Related Art

Two-component (2C) silicone compositions have been known for quite some time in the prior art, and are frequently used as adhesives and sealants in various applications. The expression "room temperature vulcanizing 2 part silicones" (RTV-2) is used to describe two-component silicones that crosslink at room temperature. One of the two components is often described as the polymer composition or as the "A" component. The second component is often called the hardener composition or else, the "B" component.

Tin catalysts are usually used, because they can give an acceptable crosslinking rate. Organotin compounds have now been classified as hazardous substances, as also has any hardener composition comprising organotin compounds. The use of organotin compounds is moreover increasingly restricted by legislation, for example the EU Directive 76/769/EEC.

There have already been various attempts to use carboxylates of other metals, for example those of Pb, Zn, Zr, Sb, Fe, Cd, Ba, Ca, Ti, Bi, and Mn, for example as disclosed in DE 1 494 065 A or DE 1 254 352 A, these carboxylates likewise having catalytic activity. However, some of these exhibit undesired side-reactions or excessively slow curing rates. Organotitanium compounds moreover exhibit the known disadvantages of Ti, for example yellow coloration, surface tack, and likewise exhibit an excessively slow vulcanization rate. Furthermore, titanium catalysts cannot be used in two-component polycondensation compositions based on OH-functional polymers because of the immediate onset of gelling. US20070237912A1 also discloses two- or multicomponent compositions which comprise fumed silica for use in facade elements. They can also optionally comprise other silicatic fillers. Here again, a large number of metal compounds are listed as possible catalysts.

U.S. Pat. No. 6,753,400 B2 also discloses compositions which cure at room temperature, comprising hydroxy-polydimethylsiloxane polymer, crosslinking agent, and Bi carboxylate as catalyst. However, these exhibit inhomogeneous in-depth curing. The alternative metal carboxylate catalysts mentioned cannot therefore achieve satisfactory in-depth curing in thick layers with thickness of 5 mm or more. Said inhomogeneous curing profile is apparent by way of example in large hardness differences between the vulcanizate surface and the interior of the sample.

DE2640328, and also U.S. Pat. No. 4,499,230, disclose single-component, and also two-component, condensation-crosslinking silicone compositions which comprise molecular sieves as desiccant/water scavengers, in order to achieve better stability of the silicone compositions in storage. The dried molecular sieve ("desiccant") used in those documents serves to adsorb moisture from the components of the formulation, and also to prevent moisture ingress due to diffusion through the packaging, in order to avoid premature moisture-degradation of the crosslinking agents required for the crosslinking process. These compositions cure to give a silicone rubber only on exposure to sufficient atmospheric moisture. U.S. Pat. No. 4,499,230 also discloses various other metal and nonmetal compounds as catalysts, alongside tin compounds. DE2640328, moreover, also mentions analogous two-component preparations in which the molecular sieves are used as a desiccant. For this, the molecular sieve is predried to a substantial level of dryness in that it is freed from water by heating to from 100 to 500° C.

The disadvantage is, however, that in-depth vulcanization in a layer thicknesses >5 mm is not sufficiently good in these formulations: a considerable hardness gradient from the outside to the inside is observable, extending as far as absence of vulcanization in the interior of the vulcanizate.

SUMMARY OF THE INVENTION

It was therefore an object of the present invention to provide RTV-2 silicone compositions which are free from tin, and which also can give rapid and uniform in-depth curing. These and other objects have been achieved via the condensation-crosslinking RTV-2 silicone composition of the invention, comprising (I) a hardener composition comprising
   (A) at least one crosslinking agent,
   (B) at least one Bi catalyst, and
(II) a polymer composition, characterized in that the polymer composition (II) comprises at least 0.2% by weight of an adsorbent (C) which is selected from the group of the moisture-saturated molecular sieves which are characterized by at most an uptake of 10% by weight of their own weight of water.

DETAILED DESCRIPTION OF THE PREFERRED EMBODIMENTS

The water of (C) is determined by measuring the relative weight increase under standard conditions, i.e. at 20° C. and 50% relative humidity, within a period of 12 hours.

The crosslinking agents (A) used in the invention in the hardener compositions (I) are preferably organosilicon compounds of the general formula (1)

$$Z_c SiR^2_{(4-c)} \qquad (1),$$

where
$R^2$ are, mutually independently, identical or different, and are monovalent, optionally substituted hydrocarbon moieties which are optionally interruption by oxygen atoms or by nitrogen atoms,
Z are, mutually independently, identical or different, and are hydrolyzable moieties, and
c is 3 or 4,
or else partial hydrolyzates of these.

The partial hydrolyzates can be partial homohydrolyzates, i.e. partial hydrolyzates of one type of organosilicon compound of the general formula (1), or else partial cohydrolyzates, i.e. partial hydrolyzates of at least two different types of organosilicon compounds of the general formula (1). The maximal weight average Mw of these crosslinking agents and, respectively partial hydrolyzates of the invention is 1200 g/mol (SEC against polystyrene standard).

Although formula (1) does not state this, the organosilicon compounds used in the invention can, as a result of the production process, comprise a small proportion of hydroxy groups, preferably up to at most 5% of all of the Si-bonded moieties.

If the crosslinking agents (A) used in the compositions of the invention are partial hydrolyzates of organosilicon compounds of the formula (1), preference is given to those having up to 10 silicon atoms.

It is preferable that moieties $R^2$ are monovalent hydrocarbon moieties having from 1 to 18 carbon atoms, optionally substituted with halogen atoms, with amino groups, with ether groups, with ester groups, with epoxy groups, with mercapto groups, with cyano groups, or with (poly)glycol moieties, where the latter are composed of oxyethylene units and/or oxypropylene units, and it is most preferable that moieties $R^2$ are alkyl moieties having from 1 to 12 carbon atoms, in particular the methyl moiety. However, moieites $R^2$ can also be divalent moieties which, by way of example, bond two silyl groups to one another.

Examples of moieties $R^2$ are alkyl moieties, for example the methyl, ethyl, n-propyl, isopropyl, 1-n-butyl, 2-n-butyl, isobutyl, tert-butyl, n-pentyl, isopentyl, neopentyl, and tert-pentyl moieties; hexyl moieties, for example the n-hexyl moiety; heptyl moieties, for example the n-heptyl moiety; octyl moieties, for example the n-octyl moiety and isooctyl moieties such as the 2,2,4-trimethylpentyl moiety; nonyl moieties, for example the n-nonyl moiety; decyl moieties, for example the n-decyl moiety; dodecyl moieties, for example the n-dodecyl moiety; octadecyl moieties, for example the n-octadecyl moiety; cycloalkyl moieties, for example the cyclopentyl, cyclohexyl, cycloheptyl, and methylcyclohexyl moieties; alkenyl moieties, for example the vinyl, 1-propenyl, and the 2-propenyl moieties; aryl moieties, for example the phenyl, naphthyl, anthryl, and phenanthryl moiety; alkaryl moieties, for example o-, m-, p-tolyl, xylyl and ethylphenyl moieties; and aralkyl moieties, for example the benzyl, and the α- and the β-phenylethyl moieties.

Examples of substituted moieties $R^2$ are methoxyethyl, ethoxyethyl, and the ethoxyethoxyethyl moieties.

Examples of divalent moieties $R^2$ are polyisobutylenediyl moieties, and propanediyl terminated polypropylene glycol moieties.

Hydrocarbon moieties having from 1 to 12 carbon atoms are preferred for moieties $R^2$, and the methyl and the vinyl moieties are particularly preferred.

Examples of Z are any of the hydrolyzable moieties known hitherto, e.g. optionally substituted hydrocarbon moieties bonded by way of an oxygen atom or a nitrogen atom to silicon.

It is preferable that moiety Z is a moiety —$OR^1$, where $R^1$ is a substituted or unsubstituted hydrocarbon moiety which is optionally interrupted by oxygen atoms. Examples of Z are methoxy, ethoxy, n-propoxy, isopropoxy, n-butoxy, isobutoxy, sec-butoxy, tert-butoxy, and 2-methoxyethoxy moieties; amino moieties, for example methylamino, dimethylamino, ethylamino, diethylamino, dipropylamino, dibutylamino, and cyclohexylamino moiety, amido moieties, for example N-methylacetamido and benzamido moieties; aminoxy moieties, for example the diethylaminoxy moiety; oximo moieties, for example the dimethylketoximo, methylethylketoximo, and methylisobutylketoximo moieties, and enoxy moieties, for example the 2-propenoxy moiety, and also acyloxy moieties, for example acetyl groups.

It is preferable that the crosslinking agents (A) used in the compositions of the invention are tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 1,2-bis(trimethoxysilyl)ethane, 1,2-bis(triethoxysilyl)ethane, and also partial hydrolyzates of the organosilicon compounds mentioned, for example hexaethoxydisiloxane.

It is most preferable that the crosslinking agents (A) used in the compositions of the invention are tetramethoxysilane, tetraethoxysilane, tetrapropoxysilane, methyltrimethoxysilane, methyltriethoxysilane, vinyltrimethoxysilane, vinyltriethoxysilane, phenyltrimethoxysilane, 1,2-bis(trimethoxysilyl)ethane, 1,2-bis(triethoxysilyl)ethane, and also partial hydrolyzates of these, in particular tetraethoxysilane, 1,2-bis(triethoxysilyl)ethane, vinyltriethoxysilane, and partial hydrolyzates and cohydrolyzates of these.

The crosslinking agents (A) used in the hardener compositions (I) of the invention are commercially available products or can be produced by processes known in silicon chemistry.

Quantities used of the crosslinking agents (A) of the invention are such as to give an at least two-fold molar excess of hydrolyzable or hydrolyzed crosslinking-agent functions, based on the terminal-group content of the constituents to be crosslinked. It is preferable that a molar ratio of crosslinking-agent functions to the groups to be crosslinked is set to from 4:1 to 15:1.

Suitable catalysts (B) of the invention are Bi compounds. Particular preference is given to Bi carboxylates and commercially available preparations of these in which the carboxylic salts have from 2 to 20 carbon units. Particular preference is given to bismuth tris(octanoate), bismuth tris(neodecanoate), and also bismuth naphthenate, and commercially available preparations of these.

The quantities of catalyst (B) present in the hardener compositions (I) of the invention are those conventional for the condensation reaction. The quantities of these present in the RTV-2 silicone composition of the invention depend on the desired potlife, being in the range from 200 to 2500 ppm, based in each case on the metal and the crosslinkable, catalyzed mixture.

The hardener compositions (I) of the invention can comprise, as a further component, adhesion promoters (D). These are regarded as functional silanes or coupling agents. Examples of the adhesion promoters (D) used in the compositions of the invention are silanes and organopolysiloxanes having functional groups, for example those having glycidoxy, amino, or methacryloxy moieties. Other compounds that can also be used as adhesion promoters (D) are silanes having hydrolyzable groups and having SiC-bonded vinyl-, acryloxy-, methacryloxy-, epoxy-, anhydride-, acid-, ester-, cyanurato-, carbamato-, or ureido-functional groups or ether groups, or else partial hydrolyzates and cohydrolyzates of these. Preferred adhesion promoters are amino-, acrylic-, epoxy-, cyanurato-, carbamato-, or ureido-functional silanes having hydrolyzable groups, and partial hydrolyzates of these. Quantities of (D) are preferably such that for every 100 parts by weight of the catalyzed, ready-to-use RTV-2 composition i.e. hardener composition (I)+polymer composition (II)) preferably a proportion of up to 50 parts by weight, particularly from 0.1 to 20 parts by weight, in particular from 0.5 to 10 parts by weight, of (D) is present.

The hardener composition (I) can moreover comprise other constituents (E) which have long been known to those skilled in the art. Examples of (E) that can be used in the compositions of the invention are fillers, for example reinforcing and non-reinforcing fillers differing from (C), for example silica, carbon black, quartz, chalk, diatomaceous earth, plasticizers, soluble dyes, inorganic and organic pigments, solvents, fungicides, odorants, dispersing agents, rheological additives, corrosion inhibitors, oxidation inhibitors, light stabilizers, heat stabilizers, flame retardants, and agents intended to influence electrical properties.

The hardener composition (I) can, by way of example, be produced via mixing of the individual components (A) and (B).

The other components (D) and (E) are likewise incorporated into the mixture if required.

Polymer compositions (II) for RTV-2 systems have long been known to the person skilled in the art. They usually comprise hydroxy-terminated polydimethylsiloxanes as crosslinkable polymers (F), and frequently a plasticizer component (G). They can, moreover, comprise the components described under (E). In the version in the invention they also comprise the adsorbent (C).

The adsorbent (C) is selected from the group of the moisture-saturated molecular sieves which are also termed zeolites, and which are characterized in that they can take up at most 10% by weight of their own weight of water, preferably at most 5% by weight. The adsorbents (C) have been known for a long time and are available commercially. Preference is given to molecular sieves (C) with pore size at least 0.4 nm (4 Angstroms), particularly at least 0.5 nm (5 Angstroms), and most preferably at least 0.8 nm 8 Angstrom). The quantity of the adsorbent (C) added to the polymer composition (II) is at least 0.2% by weight, preferably 0.5% by weight, more preferably from 0.2% to 10% by weight, and with particular preference from 0.5% to 5% by weight.

Surprisingly, it is very important that (C) has been moisture-saturated, and that the quantity of water that it can still take up is only at most 10% by weight of its own weight—preferably 5% by weight. If dry molecular sieves are used—which can usually take up to 25% by weight of their own weight of water, the result is not rapid in-depth vulcanization through the material but only formation of a thick skin, hardening of which then proceeds very slowly from the surface to greater depth: when layer thicknesses are >5 mm the deeper parts of the composition frequently retain a substantially liquid consistency after 24 h. When the substantially moisture-saturated molecular sieves of the invention are used, excellent and uniform in-depth vulcanization takes place.

It is preferable that the polydimethylsiloxanes (F) have at least two silanol groups per molecule. The viscosity of (F) is usually from 1000 to 300,000 mPa·s at 25° C., preferably from 6000 to 100,000 mPa·s.

Examples of plasticizers (G) are room-temperature-liquid diorganopolysiloxanes end-blocked by triorganosiloxy groups, for example dimethylpolysiloxanes or methylphenylpolysiloxanes end-blocked by trimethylsiloxy groups, with viscosity that is usually from 10 to 10 000 mPa·s at 25° C., preferably from 50 to 5000 mPa·s, with particular preference from 50 to 2000 mPa·s.

The polymer compositions (II) can be produced by way of example via mixing of the individual components (C), (F), and optionally (G).

The other components (E) are likewise incorporated into the mixture if required.

The condensation-crosslinking RTV-2 silicone compositions of the invention are used, by way of example, as adhesive and sealants in various applications.

The curing of RTV-2 silicone compositions is achieved by bringing the hardener composition (I) into contact with the polycomposition (II). The nature and manner of the curing of RTV-2 compositions have been known for a long time to those skilled in the art.

The advantages of the RTV-2 silicone composition of the invention consist in the use of the bismuth catalyst (B) in the hardener composition (I) in combination with moisture-saturated adsorbent (C) in the polymer composition (II). A major shift of the polycondensation equilibrium occurs, because (C) can also withdraw the resultant alcohol from the equilibrium. This leads to a synergistic effect in which the catalyst (B), hitherto regarded as unsuitable, combines with moisture-saturated adsorbent (C) to achieve uniform and good in-depth curing in the condensation-crosslinking RTV-2 silicone compositions of the invention, so that there is no need to use the undesirable Sn catalysts. It is therefore possible to achieve uniform good curing throughout the material at layer thicknesses of 5 mm or more.

Another advantage of the composition of the invention is that the raw materials to be used are easily obtainable commercially. There is moreover no need for any upstream drying process for the molecular sieve and/or handling of same with exclusion of ambient moisture.

Production of the Polymer Compositions:

The polymer composition is produced by compounding techniques known to those skilled in the art, where by way of example the polymers (F) and optionally plasticizers (G) are used as an initial charge in a planetary mixer or in a dissolver, and optional other components (E) are stirred into the mixture or are incorporated homogeneously by means of dissolver disks. The pulverulent molecular sieve (C) is incorporated and homogenized in the same manner.

Production of the Hardener Compositions:

The hardener composition is usually produced via simple stirring of crosslinking agent (A) and optionally adhesion promoters (D) together, with final addition of the catalyst (B). Solids are preferably homogenized in inert components such as plasticizers or solvents, the reactive components such as crosslinking agents (A) and optionally adhesion promoters (D) then being added, with the catalyst component (B) finally being added.

EXAMPLES

Example 1

Production of the Hardener Composition of the Invention

15% by weight of OMG Catalyst 310 (a Bi catalyst from OMG Borchers GmbH, Langenfeld) are mixed homogeneously with 40% by weight of TES34 (component (A)) (Wacker Chemie AG, Munich) and 45% by weight of Wacker AK 100 (linear, inert polydimethylsiloxane with a viscosity about 100 mm$^2$/s) (Wacker Chemie AG, Munich).

Example 2

Comparative Example (RTV-2 Silicone Composition not of the Invention, without Moisture-saturated (C))

5 parts of hardener composition (as in example 1) are added for every 100 parts of ELASTOSIL® M 4512, (Wacker Chemie AG, Munich) without addition of molecular sieves, and mixed homogeneously, and poured into metal rings (height 6 mm, diameter 43 mm) lying on Hostaflon™ films. The "6 mm hardness, top/bottom" hardness difference values were determined on these test samples after 24 hours.

Examples 3-6

RTV-2 Silicone Compositions of the Invention

Production of Polymer Compositions of the Invention:

As in table 1, the listed quantity and type of moisture-saturated molecular sieve powder is added to and homogeneously mixed with, the commercially available polymer composition (ELASTOSIL® M 4512, a pourable, room-temperature-vulcanizing, condensation-crosslinking two-component silicone rubber). The moisture-saturation of the molecular sieve powders is ensured via constant weight on exposure to standard temperature and humidity, and is apparent in a residual moisture take-up of at most 5% by weight.

The RTV-2 silicone compositions of the invention are produced by adding, for every 100 parts of the resultant polymer composition, 5 parts of the hardener composition (as in example 1), mixing homogenously, and pouring the mixture into metal rings (height 6 mm, diameter 43 mm) lying on Hostaflon™ films. The "6 mm hardness, top/bottom" hardness difference values were determined on these test samples after 24 hours.

The Following Methods were Used:

Potlife is determined by way of viscosity measurement in accordance with ISO 2555 (spindle 5, 2.5 rpm). Potlife is defined as the time required to reach a viscosity of 60,000 mPa·s.

In-depth vulcanization is assessed on the vulcanizate. For this, 300 g of (polymer composition as in example 1+hardener composition as in example 3) are charged to a polystyrene cup (65 mm×110 mm), and the mixture is demolded after 4 days of vulcanization time, and cut in half. The cut surface has to be tack-free, and its maximal permissible hardness deviation in comparison with the outer surface is 25%.

Shore A hardness, elongation at break, and ultimate tensile strength were measured on 2 mm films after 4 days of vulcanization time.

Shore A hardness is determined in accordance with DIN (German Industrial Standard) 53505 (issue of August 2000).

Elongation at break is determined in accordance with DIN 53504-85S1.

Ultimate tensile strength is determined in accordance with DIN 53504-85S1.

TABLE 1

| Example | 2 | 3 | 4 | 5 | 6 |
|---|---|---|---|---|---|
| ELASTOSIL M 4512 polymer composition [% by wt.] plus adsorbent | 100 | 99 | 98 | 99 | 98 |
| Sylosiv ® 10A (Grace GmbH) [% by wt.] | 0 | 1 | 2 | 0 | 0 |
| Zeoflair ® 100 (Zeochem AG) [% by wt.] | 0 | 0 | 0 | 1 | 2 |
| Hardener composition (as in example 1) [parts] per 100 parts of entire polymer composition | 5 | 5 | 5 | 5 | 5 |
| Properties | | | | | |
| Potlife [min] | 34 | 25 | 22 | 29 | 26 |
| In-depth vulcanization | pasty | slightly tacky | good | good | good |
| 6 mm hardness, top/bottom | 12/not measurable | 16/08 | 22/21 | 22/14 | 22/19 |
| Shore A hardness | 21 | 22 | 34 | 25 | 25 |
| Elongation at break [%] | 3.6 | 3.7 | 3.8 | 3.7 | 3.7 |
| Ultimate tensile strength [N/mm$^2$] | 290 | 290 | 270 | 280 | 280 |

Table 1 shows, alongside example 2, examples 3 to 6 of the invention, and the results of the curing process as a function of quantity and type of adsorbent.

Hardness difference value: The 6 mm test samples from example 2 are still pasty at the bottom after 24 hours, the hardness of the outer surface being Shore A 12. The test samples of the invention of examples 3-6 (i.e. with addition of molecular sieve in the polymer composition and in each case with 5 parts of hardener preparation per 100 parts of polymer composition) are demoldable after as little as 6 hours. The above/below hardness difference values of the test samples decrease as molecular sieve powder content increases, i.e. vulcanization proceeds more uniformly and more deeply. The top/bottom hardness difference values are seen to be particularly small when the quantity of adsorbent is 2% by weight.

In-depth vulcanization: After 4 days in the pot-life cup, the test sample from example 2 merely has a skin of thickness 2 cm, under which the composition continues to be pasty. All of the samples of examples 3-6 are vulcanized throughout, and only sample 3 has slight tackiness in the interior. When quantities of 2% by weight of adsorbent are added, the vulcanizate is tack-free in the interior, and potlife decreases as quantity of adsorbent increases.

Example 7 (not of the Invention)

Preparation is as in examples 3-6, but with addition of 2% of 4A molecular sieve with 15% by weight residual moisture take-up: in this case, there was still no discernible vulcanization on the underside after 24 hours, and a tack-free skin is observable only at the upper side. No hardness measurements are possible.

Example 8 (of the Invention)

Preparation is as in example 7, but with addition of 2% of 4A molecular sieve with 5% by weight residual moisture take-up: on demolding after 24 h the vulcanizate is tack-free both at the top and at the bottom, and its hardness is Shore A 17 at the top and Shore A 8 at the bottom.

Example 9 (of the Invention)

Preparation is as in example 8, but with addition of 2% of 4A molecular sieve with 10% by weight residual moisture take-up: on demolding after 24 h the vulcanizate is tack-free both at the top and at the bottom, and its hardness is Shore A 18 at the top and Shore A 4 at the bottom.

As is apparent when example 7 is compared with examples 8 and 9, when the composition not of the invention, with a molecular sieve with >10% by weight moisture take-up is used, the underside of the vulcanizate remains tacky and cannot then be demolded. Useful vulcanizates with good mechanical properties are obtained only with the compositions of the invention as in examples 8 and 9.

What is claimed is:

1. 1. A condensation-crosslinking RTV-2 silicone composition, comprising:
   (I) a hardener composition comprising
      (A) at least one crosslinking agent,
      (B) at least one Bi catalyst, and
   (II) a polymer composition,
wherein the polymer composition (II) further comprises at least 0.2% by weight of an adsorbent (C), moisture-saturated molecular sieves which can take up at most 10% by weight of their own weight of water.

2. An adhesive or sealant, comprising a condensation-crosslinking RTV-2 silicone compositions of claim 1.

3. A process for the curing of an RTV-2 silicone composition of claim 1, comprising contacting a hardener composition (I) into contact with a polymer composition (II).

* * * * *